United States Patent

Eltgroth

[15] 3,660,717

[45] May 2, 1972

[54] TELEVISION DEFLECTION CIRCUIT FOR DISTORTION CORRECTION

[72] Inventor: Matthew J. Eltgroth, Elk Grove Village, Ill.

[73] Assignee: Zenith Radio Corporation, Chicago, Ill.

[22] Filed: Nov. 3, 1969

[21] Appl. No.: 873,255

[52] U.S. Cl. ....................315/27 GD

[51] Int. Cl. ....................H01j 29/70

[58] Field of Search....................315/27 GD, 27 TD

[56] References Cited

UNITED STATES PATENTS

| | | | |
|---|---|---|---|
| 3,147,397 | 9/1964 | Michaelson | 315/27 GC |
| 3,174,074 | 3/1965 | Massman | 315/27 GC |
| 3,463,961 | 8/1969 | Neal et al. | 315/27 GC |

FOREIGN PATENTS OR APPLICATIONS

| | | | |
|---|---|---|---|
| 232,751 | 2/1961 | Australia | 315/27 |
| 1,140,231 | 7/1960 | Germany | 315/27 |

*Primary Examiner*—Carl D. Quarforth
*Assistant Examiner*—J. M. Potenza
*Attorney*—Francis W. Crotty and Cornelius J. O'Connor

[57] ABSTRACT

A vertical deflection circuit for a television receiver that utilizes a flat face picture tube in which the radius of curvature of the face is greater than its distance from the deflection center of the scanning yoke. The circuit includes an oscillator and a first wave shaping network for developing a modified sawtooth sweep signal having a flattened trailing portion. A vertical output tube, in response to this modified signal, develops an output signal having a polarity opposite that of the input sawtooth. A feedback circuit couples the output signal to the input of the oscillator and also applies it to a second wave shaping network which includes an integrating circuit for deriving a signal having a parabolic component. The modified sawtooth and the parabolic component are combined to develop an S-shaped signal having modified slope portions at both extremities. The S-shaped signal is utilized as the control signal for the vertical output tube which supplies energizing currents, that are replicas of the S-shaped signal, to the deflection yoke thereby reducing the writing speed of the beam at opposite extremities of its scansion to offset distortion in the raster attributable to the disparity between the screen radius of curvature and the location of the yoke's center of deflection.

2 Claims, 2 Drawing Figures

Inventor
Matthew J. Eltgroth
By Cornelius J. O'Connor
Attorney

TELEVISION DEFLECTION CIRCUIT FOR DISTORTION CORRECTION

BACKGROUND OF THE INVENTION

This invention relates in general to deflection circuitry for cathode-ray tubes and in particular to a wave shaping circuit for eliminating top and bottom distortion in the raster generated on the display screen of a television picture tube.

The conventional television receiver employs a cathode-ray tube and, ideally, a linear sawtooth current driven deflection yoke for developing a raster on the viewing screen of the tube. However, most cathode-ray tubes today are constructed with a relatively flat display screen so that the radius of curvature of such a screen is large compared to the radius of the arc through which the electron beam is scanned. For all practical purposes, the radius of this arc is equal to the distance from the effective center of deflection of the yoke to the surface of the display screen. As a result when a linear sawtooth signal is applied to a deflection system having the aforementioned tube and yoke geometry a distorted raster is generated. Insofar as the vertical deflection circuit is concerned, this distortion is manifested as a stretching of the reproduced picture at the top and bottom of the screen. This obtains because the electron beam, during equal increments of time, traverses greater distances across the screen at the extremities of its sweep, than it does at the center. In other words, the effective "writing speed" of the beam is faster at the beginning and end of the sweep (top and bottom of the picture) than across the center.

As would be expected this distortion can be resolved by resort to wave-shaping techniques that modify the sawtooth so that its writing speed is reduced at the start and finish of the sweep. A sawtooth so corrected is rendered S-shaped and the prior art approach to shaping the sawtooth has ranged from overly simple expedients which, at best, effect a compromise, to relatively complex circuits which, because of their sophistication, tend to be limited in application to a particular type and size picture tube and/or deflection yoke.

Insofar as the compromise approach is concerned the prior art has relied upon the non-linear characteristics of the yoke, the transfer characteristics of the vertical output tube, etc. to distort the sawtooth sufficiently to approximate an S-shape, at least at one extremity of the sawtooth.

In the sophisticated approach reliance is had upon a multitude of feedback, integrating and differentiating circuits arranged to produce a sawtooth of requisite shape. In addition to the considerable expense entailed in this approach, the resultant correction circuit, because of its complexity, also tends to be restricted to particular tube and yoke arrangements.

SUMMARY OF THE INVENTION

It is therefore a principal object of the invention to provide an improved deflection circuit for a television receiver.

It is a specific object of the invention to provide an improved vertical deflection circuit which eliminates top and bottom raster distortion in a reconstituted television image.

It is also an object of the invention to provide a distortion free vertical deflection circuit which is readily adaptable to a variety of television picture tube types and sizes and is characterized by an inexpensive construction.

A circuit for energizing the deflection yoke associated with a cathode-ray tube comprises means for developing and directing an electron beam toward a display screen. The screen has a radius of curvature that is greater than its distance from the center of deflection of the yoke so that opposite extremities of a raster developed on the screen are distorted. The circuit comprises an oscillator having a control electrode and a first wave shaping network which comprises a charging capacitor for developing a sawtooth sweep signal. This network also includes means for modifying the slope of the trailing portion of the sawtooth signal. An amplifier having an input electrode coupled to the first wave shaping network responds to the sawtooth signal to develop, at an output electrode, a feedback signal having a polarity that is opposite that of the sawtooth signal. A feedback circuit is coupled between the amplifier output and the oscillator control electrode in order to sustain oscillator operation. A second wave shaping network, comprising a portion of the feedback circuit and an integrating circuit, derives from the feedback signal a signal having a parabolic component. The modified sawtooth sweep signal and the parabolic component of the derived signal are combined to develop an S-shaped sawtooth signal having modified slope portions at both extremities. Means are provided for applying the S-shaped signal to the amplifier input electrode and, finally, means are included for coupling the amplifier output electrode to the deflection yoke in order to apply a replica of the S-shaped signal to the yoke so as to effectively reduce the writing speed of the beam at opposite extremities of its scansion and thereby offset distortion in the raster attributable to the disparity between the screen radius of curvature and the location of the yoke center of defection.

BRIEF DESCRIPTION OF THE DRAWINGS

The features of this invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figures 1, 2:
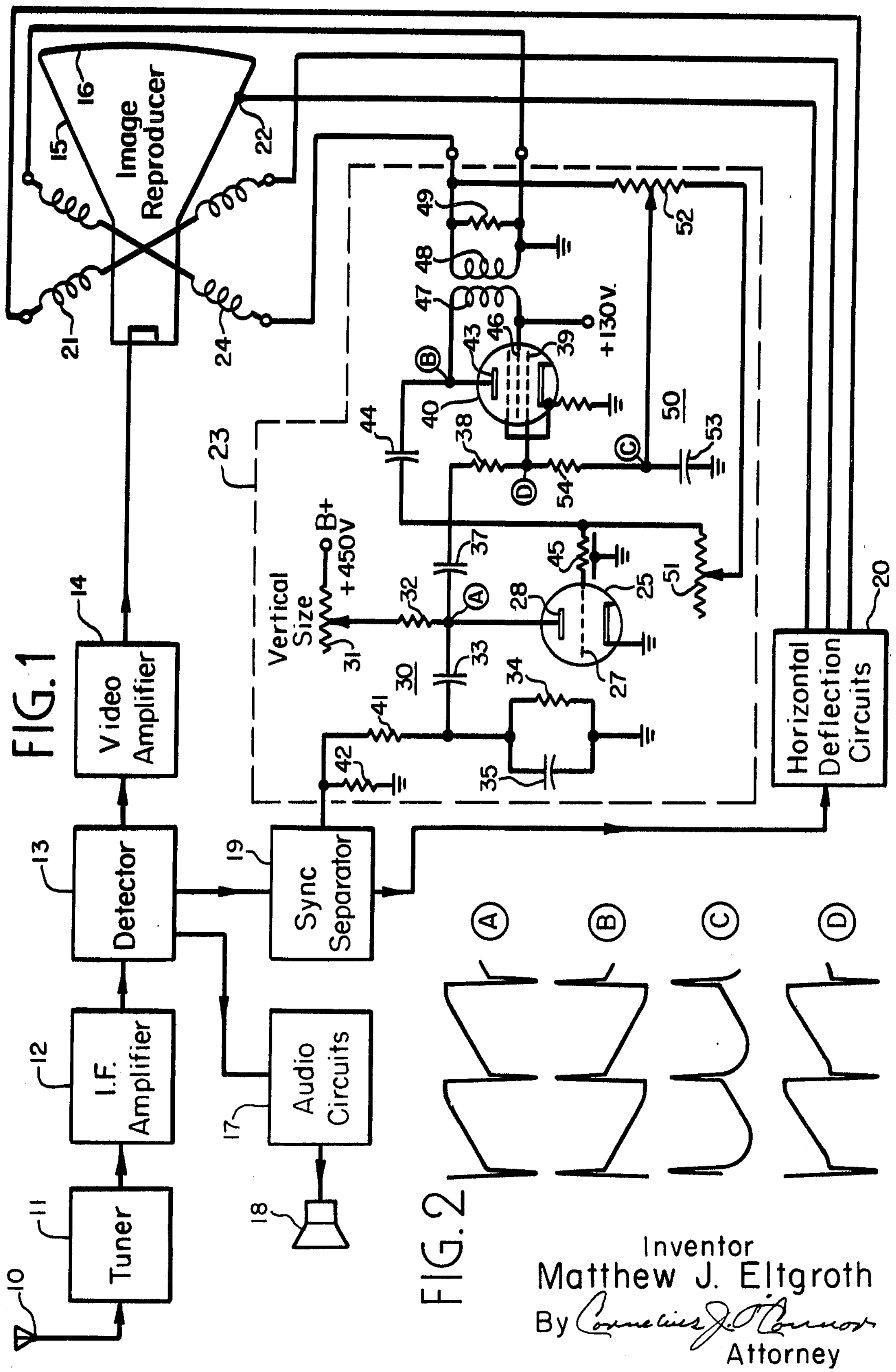
FIG. 1 is a schematic diagram of a television receiver embodying the invention.
FIG. 2 is a graphical representation of a series of waveforms helpful in an understanding of the invention.

With the exception of the vertical deflection circuitry, the television receiver illustrated in FIG. 1 is essentially conventional in design and therefore only a brief description of its structure and operation is deemed necessary. Accordingly, a received signal intercepted by an antenna 10 is coupled in a known manner to a tuner 11 which includes the usual radio frequency amplifying and heterodyning stages for converting the received signal to an intermediate frequency. After amplification in an intermediate frequency amplifier 12, the signal is applied to a detector 13 wherein video, synchronizing and sound information in the form of a composite video frequency signal is derived. The video information is amplified in an amplifier 14 and applied to the cathode of an image reproducer, cathode-ray tube 15. An electron gun, which includes this cathode, is mounted in the neck of tube 15 and serves to generate and direct an electron beam toward the display screen 16 of the tube. The surface of screen 16 is substantially flat and thus would be defined or generated by a large radius of curvature.

The sound component of the composite signal is applied to audio circuits 17, wherein conventional sound demodulation and amplification circuitry develop an output signal suitable for driving a speaker 18.

Synchronizing information, in the form of vertical and horizontal sync pulses, is separated from the composite video signal by a sync separator stage 19. The horizontal sync pulses are applied to a horizontal deflection circuit 20 which includes conventional reaction scanning circuitry for utilizing these pulses to generate synchronized horizontal sawtooth scanning currents for the horizontal deflection winding 21. Stage 20 also includes a flyback high voltage power supply that develops a DC accelerating potential for the ultor or final anode 22 of cathode-ray tube 15.

The separated vertical sync pulses are utilized by the vertical deflection stage 23 to generate synchronized vertical rate scanning currents for the vertical deflection winding 24. Windings 21 and 24 form a deflection yoke which, when energized, develop magnetic fields that conjointly operate upon the electron beam in tube 15 to generate a raster on the display screen 16 of the tube. The yoke establishes an effective center of deflection for the beam which can be considered the origin of the scanning beam. This deflection center is situated at a point within the tube at or near the location of the deflection yoke. And, as previously noted in the case of flat face cathode-ray tubes, the distance from the deflection center to the display screen is substantially less than the radius of curvature of the screen.

Turning now to a more detailed consideration of the vertical deflection stage 23, this stage is seen to comprise a vertical rate oscillator 25 having a cathode maintained at reference potential, a control electrode 27 and an anode 28. In essence, oscillator 25 functions as a discharge tube or switch that is associated with a first wave shaping network 30 comprising an adjustable resistor 31, which serves as a vertical size control, a fixed resistor 32, a charging capacitor 33 and a filter circuit which includes a resistor 34 and a capacitor 35. These elements of network 30 are serially arranged between a source of positive potential, B+, and a plane of reference potential. The juncture of resistor 32 and charging capacitor 33 is connected to anode 28 of the oscillator and, through coupling capacitor 37 and resistor 38, to the input or control electrode 39 of the vertical output amplifier tube 40. The other terminal of charging capacitor 33 is coupled to a source of vertical synchronizing pulses, sync separator 19, through an impedance network formed by resistors 41, 42. Resistors 41, 42 together with capacitor 35 and resistor 34 collectively form a wave shaping output circuit for sync separator 19 that affords noise immunity for the vertical sync pulses.

The anode or output electrode 43 of the amplifier is coupled to control grid 27 of the oscillator by a feedback circuit which includes a capacitor 44 and a resistance-capacitance integrator 45. The anode of amplifier 40 is returned to its screen grid electrode 46 and to a source of positive potential through the primary winding 47 of an output transformer. The secondary winding 48 of this transformer is connected to the vertical deflection windings 24. A resistor 49 is shunted across secondary winding 48.

A second wave shaping network 50 comprises coupling capacitor 44 of the oscillator feedback circuit, an adjustable resistor 51, which functions as a hold control for the vertical oscillator, a second adjustable resistor 52, the linearity control, and an integrating capacitor 53. The upper terminal of capacitor 53 is connected via a resistor 54 to the control electrode of amplifier 40. In this fashion resistor 54, together with resistor 38 form a voltage divider network for combining the outputs of wave shaping networks 30 and 50 and applying the resultant waveform to the control electrode of amplifier 40.

Prior to considering the operation of vertical deflection circuit 23, it will be helpful to recall that the first half of a vertical scanning sawtooth serves to control deflection of the electron beam from the top of the screen to the center while the last half controls deflection of the beam from the center to the bottom of the screen. Since, as previously noted, the problem posed in utilizing a flat face display screen is manifested as a stretching of the raster at the top and bottom, the solution now to be described, therefore, will entail slowing down the effective writing speed of the beam at the beginning and end of the sweep. As will be shown, this is achieved by developing and applying to output amplifier 40 an S-shaped sawtooth drive signal, that is, a signal characterized by a flattening of its leading and trailing portions.

The operation of vertical deflection circuit 23 is best understood by considering the operation of a complete scanning cycle. More particularly, the trace portion of the sawtooth is developed by the application of a positive potential to charging capacitor 33 through size control 31, charging resistor 32 and fixed resistor 34. During this trace period the oscillator or switch tube 25 is maintained nonconductive by virtue of a negative bias applied to its control electrode 27. By tailoring component values in the charging circuit a modified sawtooth having a linear rising portion followed by a flattened trailing edge, see waveform A, is developed at the juncture of capacitor 33 and resistor 32. This waveshape can be developed by selecting a time constant for circuit 31, 32, 33, 34 such that its charging rate diminishes before the expiration of a vertical scanning period, i.e. one-sixtieth of a second. As a result the trailing edge of the sawtooth tends to flatten thus reducing the writing speed of the deflected beam at the bottom portion of the raster.

This sawtooth, waveform A, is applied via capacitor 37 and resistor 38 to control electrode 39 of vertical amplifier 40 to render the amplifier conductive. Upon conducting, the anode potential of amplifier 40 drops and a sawtooth replica of the input signal, waveform B, is developed across primary winding 47 of the output transformer. At the completion of the sawtooth scan a negatively going vertical synchronizing pulse is supplied by sync separator 19 and applied through charging capacitor 33 and coupling capacitor 37 to control electrode 39 to cut-off amplifier 40. Instantly, an amplified and inverted version of this sync pulse is developed at the anode of amplifier 40 and coupled via capacitor 44 to integrator 45 which serves to shape the now positive going vertical sync pulse, as well as to bypass any horizontal sync pulses. The application of this positive pulse to the control electrode of switch tube 25 renders the tube conductive so that it discharges capacitor 33. During its conduction period, the grid circuit of tube 25 draws current and establishes a negative charge on capacitor 44. After the passage of the positive sync pulse, tube 25 returns to a nonconductive state and is maintained nonconductive by virtue of a bias developed by the discharging of capacitor 44 through vertical hold control 51, adjustable resistor 52 and resistor 49.

Thus far the vertical deflection circuit 23 has been shown as developing a sawtooth having a flattened trailing portion. In order to reduce the writing speed of the initial portion of the sawtooth, the second wave shaping network 50 is utilized. Specifically, the signal appearing on the anode of amplifier 40, waveform B, is shaped by applying that signal through hold control 51 and linearity control 52 to integrating capacitor 53, with each of controls 51 and 52 contributing to the resistive component of this integrating circuit. When waveform B is integrated, the resulting waveform comprises an initial parabolic component that tapers into a sawtooth portion terminated by a pulse, see waveform C. By adjusting resistor 52 the degree of integration, and therefore the amount of parabolic component, is controlled. A desired portion of parabolic component is thus selected and combined with the modified sawtooth in resistive circuit 38, 54 to provide an S-shaped sawtooth having flattened leading and trailing edges, waveform D. The values assigned to resistors 38, 54 determine, in part, the relative proportions of parabolic component and modified sawtooth required to produce the desired S-shaped sawtooth. Upon application of this modified sawtooth D to control grid 39, amplifier 40 supplies energizing currents to vertical deflection coils 24 that develop top and bottom portions of the raster at slower writing speeds than the center portion. In this fashion top and bottom distortion due to the disparity between the radius of curvature of the screen and the location of the deflection center of the yoke is compensated for.

A vertical deflection circuit has been constructed in accordance with the schematic diagram of FIG. 1 and has been found to give very satisfactory performance; merely by way of illustration and in no sense by way of limitation, some of the circuit parameters for the vertical deflection system so constructed are as follows:

| | |
|---|---|
| Cathode-ray tube 15 | 12DKP4 |
| Discharge tube 25 | Triode section of a 17JZ8 |
| Amplifier 40 | Pentode section of a 17JZ8 |
| Charging Capacitor 33 | 0.033 microfarads |
| Capacitor 35 | 820 picofarads |
| Capacitor 37 | 0.068 microfarads |
| Capacitor 44 | 0.0033 microfarads |
| Integrating Capacitor 53 | 0.0047 microfarads |
| Potentiometer 31 | 7 megohms |
| Resistor 32 | 4.7 megohms |
| Resistor 34 | 15 kilohms |
| Resistor 38 | 27 kilohms |

| | |
|---|---|
| Resistor 41 | 1 megohm |
| Resistor 42 | 82 kilohms |
| Resistor 49 | 270 ohms |
| Potentiometer 51 | 1 megohm |
| Potentiometer 52 | 290 kilohms |
| Resistor 54 | 1 megohm |
| Integrator 45 equivalent to: | |
| Series Resistor | 70 kilohms |
| Distributed Shunt Capacitance | 0.0033 microfarads |

The described vertical deflection circuit is seen to provide a simple and effective arrangement for eliminating top and bottom raster distortion in a television image. This circuit is readily adaptable to a variety of picture tube applications, it being only necessary to select component values for the wave shaping and signal combining circuits to achieve this flexibility. Moreover, by including the hold control for the vertical oscillator in one of the wave shaping circuits a significant economy is achieved.

While a particular embodiment of the invention has been shown and described, it is apparent that changes and modifications may be made therein without departing from the invention in its broader aspects. The aim in the appended claims, therefore, is to cover all such changes and modifications as fall within the true spirit and scope of the invention.

I claim:

1. A circuit for energizing a deflection yoke associated with a cathode-ray tube which has means for developing and directing an electron beam toward a display screen, said screen having a radius of curvature that is greater than its distance from the center of deflection of said yoke so that opposite extremities of a raster developed on said screen tend to be distorted, said circuit comprising:

an oscillator having a control electrode;

a first wave shaping network comprising a charging capacitor for developing a sawtooth sweep signal in which the slope of the trailing portion of said sawtooth signal differs from the slope of the initial portion of said sawtooth signal;

an amplifier having an input electrode coupled to said first wave shaping network and responsive to said sawtooth signal for developing at an output electrode of said amplifier a feedback signal having a polarity opposite that of said sawtooth signal;

a feedback circuit coupled between said amplifier output electrode and said oscillator control electrode for sustaining oscillator operation;

a second wave shaping network comprising a portion of said feedback circuit and an integrating circuit for deriving from said feedback signal a signal having a parabolic component;

means, including a single passive resistive voltage divider circuit coupled to both said wave shaping circuits for effecting a parallel feed of said sawtooth signal and said parabolic component of said derived signal, for combining said sawtooth signal and said parabolic component to develop an S-shaped sawtooth signal having modified slope portions at both extremities and for applying said S-shaped signal to said amplifier input electrode;

and means for coupling said amplifier output electrode to said deflection yoke to apply a replica of said S-shaped signal to said yoke for effectively altering the writing speed of said beam at opposite extremities of its scansion to offset distortion in the raster attributable to the disparity between said screen radius of curvature and the location of the center of deflection of said yoke.

2. A circuit as set forth in claim 1 in which said second wave shaping network includes an adjustable hold control for said oscillator.

* * * * *